Dec. 3, 1946.  P. CAHEN  2,411,985
BURR REMOVER
Filed Feb. 3, 1944
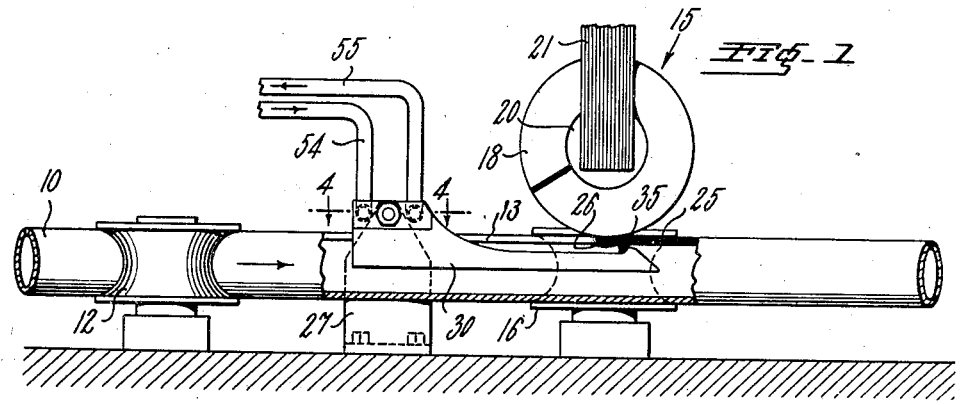
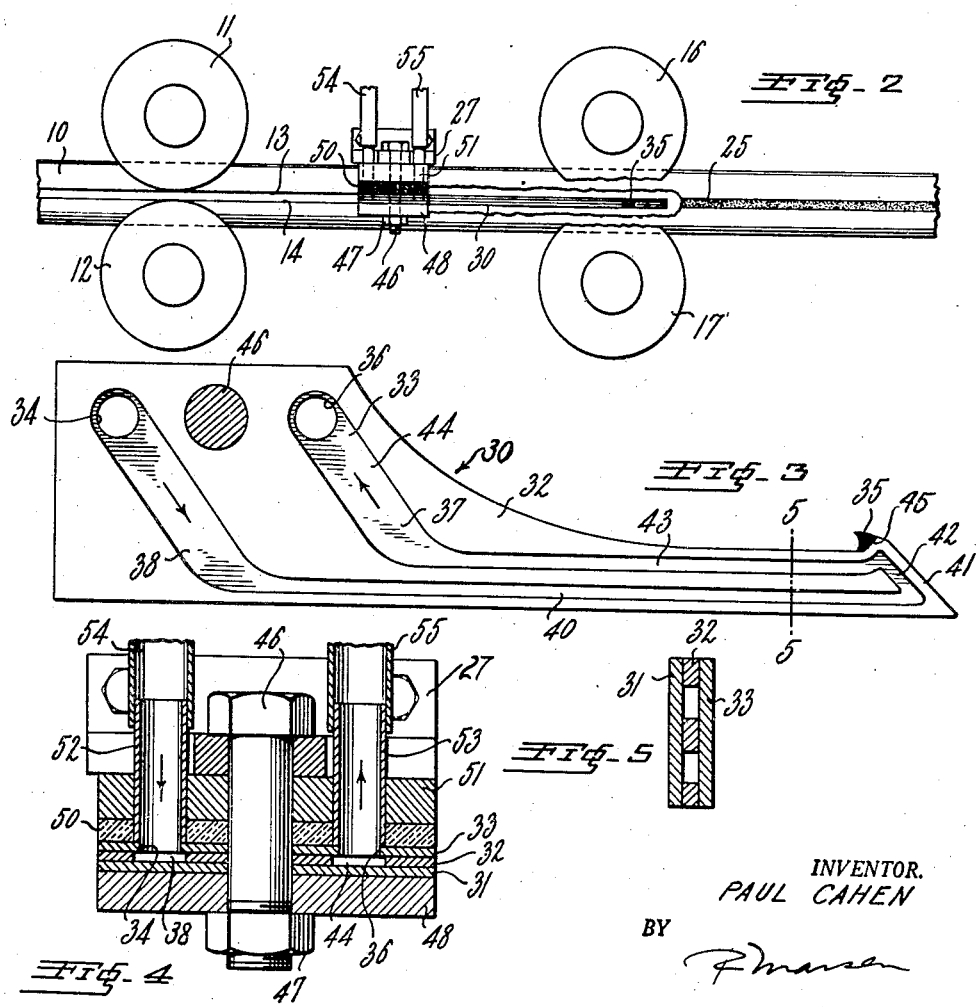
INVENTOR.
PAUL CAHEN
BY
ATTORNEY Patented Dec. 3, 1946

2,411,985

UNITED STATES PATENT OFFICE 2,411,985

BURR REMOVER

Paul Cahen, Rio de Janeiro, Brazil

Application February 3, 1944, Serial No. 520,990

5 Claims. (Cl. 90—24)

This invention relates to welding apparatus and more particularly to a burr remover for removing excess metal from a welded joint.

The invention is particularly applicable to the manufacture of welding tubing for use as armored enclosures for electrical conductors, although it should be understood that the invention is not limited to such application, but is capable of general use. Such tubing must have a smooth inner surface in order that the insulation of the electrical conductor will not be damaged or destroyed when the tubing is pulled or placed thereover. The present invention provides an apparatus for removing excess metal from the inside of the welded joint so that a smooth inner surface is provided for the tubing.

In the manufacture of welded tubing, a sheet of metal of desired size is passed between a series of forming rolls which shape the metal into tubular form and bring the adjacent edges into juxtaposed relation. The formed tubing is then passed in operative relation with welding apparatus to form a welded joint uniting the juxtaposed edges. A pair of rolls are generally disposed adjacent the welding point to maintain the tubing edges in predetermined relation as they pass beneath the welding apparatus. In order to further insure a predetermined spacing between the edges, a spacer member is arranged in advance of the welding point and extends between and preferably engages the edges to be welded. In the present invention, a device is incorporated with such spacing member to extend inside the tubing as it is welded and engage the underside of the welded joint, as it is formed and immediately beyond the welding point, to scrape excess metal from the joint while the weld metal is still hot and in a semi-plastic condition.

It is therefore among the objects of this invention to provide welding apparatus for forming welded tubing having a smooth inner surface; to provide apparatus for removing excess metal from a welded joint as the welded joint is formed; to provide a device for use in tube welding apparatus effective to maintain the edges to be welded in predetermined spaced relation and to remove excess metal from the inside of the joint as it is formed; and to provide a simple and effective device for removing excess metal from a welded joint to provide a smooth surface.

These and other objects, advantages and features of the present invention will be apparent from the following description and the accompanying drawing. In the drawing:

Fig. 1 is an elevation view, partly in section, of tube welding apparatus embodying the invention.

Fig. 2 is a plan view, partly broken away, of the welding apparatus shown in Fig. 1.

Fig. 3 is a longitudinal sectional view through a burr remover forming part of the invention.

Fig. 4 is a sectional view on the line 4—4 of Fig. 1.

Fig. 5 is a cross-sectional view on the line 5—5 of Fig. 3.

Referring to the drawing, Figs. 1 and 2 illustrate welding apparatus for forming welded tubing. In the illustrated method of welding, a tube 10 having been previously shaped into tubular form by conventional means common in the art, is passed between a pair of spaced rollers 11 and 12 which bring the edges 13 and 14 of the tubing into juxtaposed relation. From rolls 11 and 12, tubing 10 passes between rolls 16 and 17 arranged in alignment with suitable welding apparatus 15 which may be of the type described and claimed in my copending application Serial No. 537,500. Such welding apparatus may comprise a rotatable welding transformer secondary winding 18 mounted on a bearing member 20 fixed to a core 21 of a welding transformer, all as described in said copending application. However, the illustrated welding apparatus is exemplary only, and the invention may be carried out equally well with other types of resistance welding apparatus or other welding means such as electric arc welding, gas welding, and so forth.

As the tubing 10 passes in operative relation to the welding apparatus 15, a welded joint 25 is formed between the tubing edges 13 and 14 to weld unite such edges. During the formation of such welded joint, weld metal in the heated condition, which is semiplastic, tends to droop downwardly beneath the inner surface of the welded tubing leaving a reinforcement or burr 26 on the joint 25. Such burr is an undesirable feature of the tubing when it is used to enclosed insulated electrical conductors. As the conductors are placed in tubing having the burr thereon, the insulation may be seriously damaged or destroyed. The present invention provides a means for effectively removing the burr 26 so that the inside of the tubing presents a smooth, continuous surface without projections or other irregularities.

The burr remover apparatus of the invention comprises an elongated device 30 which extends inside the tubing in alignment with the welded joint. The device 30 includes a member 35 of material having red hardness characteristics. The member 35, in a manner to be described more fully hereinafter, engages the inside surface of tubing 10 and abuts the burr 26 at a point immediately beyond the welding point to remove the hot, semi-plastic metal forming the burr 26, leaving a smooth interior surface on tubing 10.

Elongated device 30 is pivotally supported on a bracket 27 at a point in advance of the welding apparatus 15. Referring more particularly to Figs. 3, 4 and 5, device 30 comprises three congruent juxtaposed plates 31, 32 and 33, having, in longtiudinal elevation, somewhat the contour of a slipper or shoe. Plate 33 is provided with a pair of apertures 34 and 36 which register respectively with opposite ends of a cut-out portion 37 in the intermediate plate 32. The cut-out portion 37 has a cross-sectional area substantially equal to the cross-sectional area of apertures 34 and 36, and extends from adjacent one aperture 34 downwardly, as indicated at 38, and then adjacent the lower edge of plate 32 as indicated at 40. Near the forward end 41 of plate 32 passage 37 is reversely directed, parallel to the forward end, as indicated at 42, and extends to a point adjacent the member 35. Passage 37 then extends rearwardly as indicated at 43 and upwardly as at 44 to communicate with aperture 36. The plate 31 is substantially imperforate. The three plates 31, 32 and 33 are united along their peripheral portions, by suitable means such as welding, to form a sealed unitary member containing the passage 37.

Adjacent its forward end, device 30 is formed with a shoulder 45 to which is secured, as by deposition from a weld rod of suitable material, the member 35. Such member is formed of metal having red hardness characteristics, that is, the metal of member 35 is such as to retain its full hardness at the elevated welding temperatures. A suitable material may be a tungsten carbide or a metal of the type known to the trade as "Stellite."

Device 30 is supported on bracket 27 by a pivoting bolt 46 provided with a nut 47. For this purpose, a metal block 48 engages the outer side of plate 31, a layer 50 of heat insulating material, such as one of the synthetic resins, engages the outer side of plate 33 and a metal block 51 engages the outer side of insulating member 50. Through bolt 46 and nut 47, blocks 48 and 51 clamp heat insulating member 50 in fluid tight engagement with plate 33. Member 50 and block 51 are provided with coaxial apertures which receive nipples 52 and 53 registering respectively with the apertures 34 and 36 in plate 33. Suitable conduit means 54 and 55 are connected to nipples 52 and 53 and to a source of cooling fluid and a discharge therefor. Through the described arrangement, cooling fluid enters through conduit 54, nipple 52 and aperture 34 into the portion 38 of passage 37, and circulates through this passage in conductive relation with burr removing member 35. The cooling fluid is discharged from portion 44 of passage 37 through aperture 36, nipple 53 and conduit 55.

Device 30 is pivotally mounted on the bracket 27 so that the extent of engagement of member 35 with burr 26 may be suitably regulated by the provision of adjusting bolts or tension members. As such adjusting means are old and well known, they have been omitted from the drawing in order to simplify the illustration. However even without such adjusting or tensioning means, engagement of member 35 with burr 26 tends to pivot device 30 in a direction to maintain member 35 in close engagement with the inside surface of the tubing. The forward portion of device 30, as may be noted from Fig. 2, extends between edges 13 and 14 of tubing 10 immediately in advance of rolls 16 and 17, and, in cooperation with such rolls, maintains the edges spaced apart the predetermined desired distance for the welding operation.

Summarizing, the operation of the described apparatus is as follows. The formed tubing 10 passes from rolls 11, 12 beneath welding apparatus 15 and between rolls 16 and 17. The edges are held in properly spaced relation by device 30 and rolls 16 and 17. As tubing 10 passes beneath apparatus 15, a welded joint 25 is formed between edges 11 and 12 and may have a burr 26 thereon inside the tubing. The hot semi-plastic metal comprising burr 26 is scraped from the inside of joint 25 by the hard metal member 35 mounted in the forward end of device 30. As a result, tubing 10 is formed with a smooth inside surface free of irregularities or projections and may be effectively used to encase insulated electrical conductors. When member 35 has been worn away to a point where it is ineffective, a new deposit of metal is added thereto by deposition from a weld rod. Generally, such renewal of member 35 is necessary only at relatively long intervals.

While a specific embodiment of the invention has been described in detail to illustrate the application of the principles thereof, it will be understood that the invention may be otherwise embodied without departing from such principles.

What is claimed is:

1. A device for removing excess weld metal from a welded joint formed between a pair of juxtaposed metal edges as the edges are moved progressively past welding apparatus at a welding point to form a welded joint uniting the edges comprising an elongated element extending between and beneath such edges and along the path of movement thereof, said element including a plurality of peripherally congruent juxtaposed elongated plates, the peripheries of said plates being weld united to seal the same; a hardened member mounted on the inner end of said element and engaging the welded joint as the edges are moved progressively past the welding point to scrape excess metal from the welded joint; an inner one of said plates having cut-out portions forming, with the outer plates, a coolant passage in heat conductive relation with said member; means providing for introduction of coolant into said passage; and means providing for discharged coolant from said passage.

2. A device for removing excess weld metal from a welded joint formed between a pair of juxtaposed metal edges as the edges are moved progressively past welding apparatus at a welding point to form a welded joint uniting the edges comprising an elongated element extending between and beneath such edges and along the path of movement thereof, said element including a plurality of peripherally congruent juxtaposed elongated plates, the peripheries of said plates being weld united to seal the same; a hardened member mounted on the inner end of said element and engaging the welded joint as the edges are moved progressively past the welding point to scrape excess metal from the welded joint; an inner one of said plates having cut-out portions forming, with the outer plates, a coolant passage in heat conductive relation with said member; a pair of apertures formed in one of said outer plates, each communicating with one end of said coolant passage; and conduit means communicating with said coolant passage through the apertures in said one outer plate for introducing coolant into said passage and for discharging coolant therefrom.

3. A device for removing excess weld metal from a welded joint formed between a pair of juxaposed metal edges as the edges are moved progressively past welding apparatus at a welding point to form a welded joint uniting the edges comprising an elongated element extending between and beneath such edges and along the path of movement thereof, said element including a plurality of peripherally congruent juxtaposed elongated plates, the peripheries of said plates being weld united to seal the same; an insert of metal retaining its hardness at elevated temperatures mounted on the inner end of said element and engaging the welded joint on the opposite side thereof from the welding apparatus immediately beyond the welding point while the metal thereof is still semi-plastic as the edges are moved progressively past the welding point to scrape excess metal from such opposite side of the welded joint; an inner one of said plates having cut out portions forming, with the outer plates, a coolant passage in heat conductive relation with said insert; means providing for introduction of coolant into said passage; and means providing for discharge of coolant from said passage.

4. A device for removing excess weld metal from a welded joint formed between a pair of juxtaposed metal edges as the edges are moved progressively past welding apparatus at a welding point to form a welded joint uniting the edges comprising an elongated element extending between and beneath such edges and along the path of movement thereof, said element including three peripherally congruent juxtaposed elongated plates and the peripheries of said plates being weld united to seal the same; an insert of metal retaining its hardness at elevated temperatures mounted on the inner end of said element and engaging the welded joint on the opposite side thereof from the welding apparatus immediately beyond the welding point while the metal thereof is still semi-plastic as the edges are moved progressively past the welding point to scrape excess metal from such opposite side of the welded joint; the inner one of said plates having cut out portions forming, with the outer plates, a coolant passage in heat conductive relation with said insert; a pair of apertures formed in one of said outer plates each communicating with one end of said coolant passage; and conduit means communicating with said coolant passage through the apertures in said one outer plate for introducing coolant into said passage and for discharging coolant therefrom.

5. A device for removing excess weld metal from a welded joint formed between a pair of juxtaposed metal edges as the edges are moved progressively past welding apparatus at a welding point to form a welded joint uniting the edges comprising an elongated element extending between and beneath such edges and along the path of movement thereof, said element including three peripherally congruent juxtaposed elongated plates and the peripheries of said plates being weld united to seal the same; an insert of metal retaining its hardness at elevated temperatures mounted on the inner end of said element and engaging the welded joint on the opposite side thereof from the welding apparatus immediately beyond the welding point while the metal thereof is still semi-plastic as the edges are moved progressively past the welding point to scrape excess metal from such opposite side of the welded joint; the inner one of said plates having cut out portions forming, with the outer plates, a coolant passage in heat conductive relation with said insert; a pair of apertures formed in one of said outer plates each communicating with one end of said coolant passage; a flexible member engaging the outer surface of said one outer plate and formed with a pair of apertures registering with the apertures in said one outer plate; means clamping said flexible member to said one outer plate; and a pair of conduits each sealingly inserted in one of said flexible member apertures and each communicating with one end of said coolant passage through the apertures in said one outer plate for introducing coolant into said passage and for discharging coolant therefrom.

PAUL CAHEN.